(12) United States Patent
Malatesha (10) Patent No.: US 10,417,021 B2
(45) Date of Patent: Sep. 17, 2019

(54) INTERACTIVE COMMAND ASSISTANT FOR AN INTERACTIVE WHITEBOARD APPLIANCE

(71) Applicant: Rathnakara Malatesha, Sunnyvale, CA (US)

(72) Inventor: Rathnakara Malatesha, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 490 days.

(21) Appl. No.: 15/061,793

(22) Filed: Mar. 4, 2016

(65) Prior Publication Data

US 2017/0255477 A1 Sep. 7, 2017

(51) Int. Cl.
*G06F 3/048* (2013.01)
*G06F 9/451* (2018.01)
*G06F 9/455* (2018.01)

(52) U.S. Cl.
CPC .......... *G06F 9/453* (2018.02); *G06F 9/45512* (2013.01)

(58) Field of Classification Search
CPC ............... G10L 15/26; G10L 2015/223; G10L 2021/0135; G06F 3/167; H04L 51/04;
(Continued)

(56) References Cited

U.S. PATENT DOCUMENTS 7,299,405 B1 11/2007 Lee
7,603,413 B1 * 10/2009 Herold ................... G06Q 10/10
  709/204
(Continued)

FOREIGN PATENT DOCUMENTS

JP 2006-164177 6/2006
JP 2010512575 A 4/2010
(Continued)

OTHER PUBLICATIONS

Malatesha, U.S. Appl. No. 15/061,806, filed Mar. 4, 2016, Final Office Action, dated Nov. 13, 2017.
(Continued)

*Primary Examiner* — Linh K Pham
(74) *Attorney, Agent, or Firm* — Hickman Palermo Becker Bingham LLP; Edward A. Becker (57) ABSTRACT

A method and apparatus for providing an interactive command assistant on an interactive whiteboard appliance is provided. A method comprises: generating an interactive command assistant chat window comprising a prompt; receiving a command word; submitting, to an interactive command manager, the command word causing the interactive command manager to identify a tree having the command word as a non-leaf node and including a second response options as child nodes of the non-leaf node; receiving the second response options each comprising an object word corresponding to the command word; displaying, in the interactive command assistant chat window, the second response options; receiving, via the interactive command assistant chat window, a second response option; in response to determining that the combination of the first response option and the second response option represent the complete command, generate an executable command; automatically causing the interactive whiteboard appliance to execute the executable command.

20 Claims, 6 Drawing Sheets

(58) Field of Classification Search
CPC ..... H04L 51/046; H04L 51/32; H04L 12/282; H04L 51/18
See application file for complete search history.

(56) References Cited

U.S. PATENT DOCUMENTS

| | | | | |
|---|---|---|---|---|
| 7,617,108 | B2* | 11/2009 | Matsubara | G10L 15/22 704/270 |
| 7,706,904 | B2 | 4/2010 | Jones | |
| 8,554,559 | B1 | 10/2013 | Aleksic | |
| 8,723,791 | B2 | 5/2014 | Kalaldeh | |
| 9,070,367 | B1* | 6/2015 | Hoffmeister | G10L 15/187 |
| 9,210,200 | B1 | 12/2015 | Chapweske | |
| 9,368,114 | B2 | 6/2016 | Larson | |
| 9,728,188 | B1* | 8/2017 | Rosen | G10L 15/22 |
| 10,102,844 | B1* | 10/2018 | Mois | G06F 16/3329 |
| 2003/0130976 | A1* | 7/2003 | Au | G06F 17/27 706/55 |
| 2003/0234772 | A1 | 12/2003 | Zhang | |
| 2005/0022274 | A1* | 1/2005 | Campbell | A61B 5/14532 604/131 |
| 2007/0020604 | A1* | 1/2007 | Chulet | G09B 5/06 434/350 |
| 2008/0222142 | A1 | 9/2008 | O'Donnell | |
| 2009/0271848 | A1 | 10/2009 | Leung | |
| 2010/0205544 | A1* | 8/2010 | Brzeski | H04L 12/66 715/758 |
| 2010/0246788 | A1 | 9/2010 | Menard | |
| 2010/0250243 | A1 | 9/2010 | Schalk | |
| 2011/0061005 | A1* | 3/2011 | Zha | H04L 12/1818 715/753 |
| 2011/0157365 | A1 | 6/2011 | Sato | |
| 2011/0237301 | A1 | 9/2011 | Patel | |
| 2012/0069131 | A1 | 3/2012 | Abelow | |
| 2012/0260177 | A1 | 10/2012 | Sehrer | |
| 2012/0262296 | A1 | 10/2012 | Bezar | |
| 2013/0063537 | A1 | 3/2013 | Emori | |
| 2013/0144961 | A1* | 6/2013 | Park | H04L 51/046 709/206 |
| 2013/0275317 | A1 | 10/2013 | West | |
| 2013/0282381 | A1 | 10/2013 | Mauro | |
| 2013/0339537 | A1 | 12/2013 | Joy et al. | |
| 2014/0006022 | A1* | 1/2014 | Yoon | H04N 21/234336 704/235 |
| 2014/0067842 | A1* | 3/2014 | Chen | G06F 17/30386 707/758 |
| 2014/0115456 | A1* | 4/2014 | White | G10L 15/22 715/708 |
| 2014/0298178 | A1 | 10/2014 | Kilgour | |
| 2014/0333531 | A1 | 11/2014 | Phang | |
| 2014/0365922 | A1* | 12/2014 | Yang | H04L 51/32 715/758 |
| 2015/0015504 | A1 | 1/2015 | Lee | |
| 2015/0085058 | A1 | 3/2015 | Zhang | |
| 2015/0088496 | A1 | 3/2015 | Harada | |
| 2015/0169069 | A1 | 6/2015 | Lo | |
| 2015/0199967 | A1* | 7/2015 | Reddy | G10L 25/30 704/249 |
| 2015/0248534 | A1 | 9/2015 | Krzywicki | |
| 2015/0261496 | A1 | 9/2015 | Faaborg | |
| 2015/0319203 | A1* | 11/2015 | Jeremias | H04L 51/20 715/753 |
| 2015/0339104 | A1 | 11/2015 | Frenkiel | |
| 2015/0347204 | A1 | 12/2015 | Stanley-Martbell | |
| 2015/0373183 | A1* | 12/2015 | Woolsey | G06F 17/289 348/14.08 |
| 2016/0034253 | A1 | 2/2016 | Bang | |
| 2016/0037311 | A1* | 2/2016 | Cho | G06Q 10/00 455/466 |
| 2016/0048368 | A1 | 2/2016 | McGibney | |
| 2016/0071486 | A1 | 3/2016 | Beyers | |
| 2016/0117730 | A1* | 4/2016 | Nats | G06Q 30/0257 705/14.55 |
| 2016/0148616 | A1 | 5/2016 | Takayanagi | |
| 2016/0180846 | A1 | 6/2016 | Lee | |
| 2016/0182579 | A1 | 6/2016 | Tsang | |
| 2016/0182709 | A1* | 6/2016 | Kim | H04W 4/14 455/556.2 |
| 2016/0205049 | A1* | 7/2016 | Kim | H04L 51/046 455/414.1 |
| 2016/0205350 | A1* | 7/2016 | Peled | H04L 12/1822 348/14.08 |
| 2016/0247503 | A1* | 8/2016 | Vanheuverswyn | G10L 15/22 |
| 2016/0292897 | A1 | 10/2016 | Gabor | |
| 2016/0330404 | A1 | 11/2016 | Nelson | |
| 2016/0337291 | A1* | 11/2016 | Park | H04L 51/14 |
| 2016/0337416 | A1 | 11/2016 | Galbraith | |
| 2016/0358603 | A1* | 12/2016 | Azam | G10L 15/22 |
| 2016/0364368 | A1* | 12/2016 | Chen | H04L 51/16 |
| 2017/0017861 | A1 | 1/2017 | Patil | |
| 2017/0018282 | A1 | 1/2017 | Tsai | |
| 2017/0019402 | A1 | 1/2017 | Kulkami | |
| 2017/0085940 | A1 | 3/2017 | Innes | |
| 2017/0118336 | A1* | 4/2017 | Tapuhi | H04M 3/4938 |
| 2017/0223069 | A1* | 8/2017 | Arora | G06F 3/04817 |
| 2017/0255446 | A1 | 9/2017 | Malatesha et al. | |
| 2017/0256260 | A1 | 9/2017 | Jeong | |

FOREIGN PATENT DOCUMENTS

| | | |
|---|---|---|
| JP | 2013-541042 | 11/2013 |
| JP | 2013-246420 | 12/2013 |
| JP | 2013-258700 | 12/2013 |
| JP | 2014-104449 | 6/2014 |
| JP | 2015-115031 | 6/2015 |

OTHER PUBLICATIONS

Malatesha, U.S. Appl. No. 15/061,806, filed Mar. 4, 2016, Office Action, dated Jun. 9, 2017.

Malatesha, U.S. Appl. No. 15/061,806, filed Mar. 4, 2016, Advisory Action, dated Dec. 17, 2018.

Malatesha, U.S. Appl. No. 15/061,806, filed Mar. 4, 2016, Notice of Allowance, dated May 1, 2019.

* cited by examiner

INTERACTIVE COMMAND ASSISTANT FOR AN INTERACTIVE WHITEBOARD APPLIANCE

TECHNICAL FIELD

The present application relates generally to interactive whiteboard appliances.

BACKGROUND

Interactive whiteboard appliances can be awkward and cumbersome to control. The difficulty may result in user being unable or unwilling to exploit the available features of the interactive whiteboard appliances. The user may, for example, have to learn to navigate complex menus or memorize icons corresponding to common commands. Further, while expert users have had time to learn the available features, novice users may flounder or visibly hesitate when using a new feature when presenting to other users, reducing the credibility of the novice user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An interactive whiteboard appliance comprises: one or more processors; a non-transitory computer-readable medium having instructions embodied thereon, the instructions when executed by the one or more processors cause performance of: generating, at an interactive whiteboard appliance, an interactive command assistant chat window, the interactive command assistant chat window comprising a prompt including a first set of response options for the prompt, wherein each of the response options comprises a command word; receiving of a first response option from the first set of response options; submitting, to an interactive command manager, the command word and causing the interactive command manager to identify a hierarchical structure from a plurality of hierarchical structures stored in a knowledge base having the command word as a non-leaf node and including a second set of response options as child nodes of the non-leaf node; receiving, from the interactive command manager, the second set of response options each comprising an object word corresponding to the command word; displaying, in the interactive command assistant chat window, the second set of response options; receiving, via the interactive command assistant chat window, a second response option of the second set of response options; submitting, to the interactive command manager, the second response option and causing the interactive command manager to determine whether a combination of the first response option and the second response option represent a complete command and, in response to determining that the combination of the first response option and the second response option represent the complete command, generate, from the first response option and the second response option, an executable command of an application executed by the interactive whiteboard appliance; receiving, from the interactive command manager, the executable command; automatically causing the interactive whiteboard appliance to execute the executable command.

In some embodiments, in the interactive whiteboard appliance, the instructions, when executed, further cause: receiving, in the interactive command assistant chat window, a command phrase including a different command word and a different object word; submitting, to the interactive command manager, the different command word and causing the interactive command manager to identify a different hierarchical structure from the plurality of hierarchical structures stored in the knowledge base corresponding to the different command word; receiving, from the interactive command manager, a third set of response options each comprising an object word corresponding to the command word; determining that the object word matches a third response option of the third set of response options; submitting, to the interactive command manager, the third response option and causing the interactive command manager to determine whether a combination of the different command word and the different object word option represent a complete command, in response to determining that the combination of the different command word and the different object word represent the complete command, and to generate, from the different command word and the different object word, a different executable command of the interactive whiteboard appliance; receiving, from the interactive command manager, the different executable command; automatically causing the interactive whiteboard appliance to execute the different executable command.

In some embodiments, in the interactive whiteboard appliance, the instructions, when executed, further cause: if the second response option is not the first terminal response option, submitting, to the interactive command manager, the second response option and causing the interactive command manager to identify, from the hierarchical structure from a plurality of hierarchical structures stored in the knowledge base corresponding to the command word, one or more third response options that are child nodes of the second response option; receiving, from the interactive command manager the one or more third response options; displaying, in the interactive command assistant chat window, the one or more third response options; receiving, in interactive command assistant chat window, a third selection of a third response option of the one or more third response options; determining that the third response option is the first terminal response option.

In some embodiments, in the interactive whiteboard appliance, the interactive command manager determines that the second response option is the first terminal response option by: receiving, from the interactive command manager, an instruction that at least one of the second set of response options is the first terminal response option; determining that the selected second response option matches the at least one of the second set of response options that is the first terminal response option.

In some embodiments, in the interactive whiteboard appliance, wherein the interactive command manager determines that the second response option is the first terminal response option by: determining, that the first response option and the second response option together are associated with a stored executable command.

In some embodiments, in the interactive whiteboard appliance, the first response option is received via a stylus input device.

In some embodiments, in the interactive whiteboard appliance, the first response option is received via a microphone associated with the interactive whiteboard appliance.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An interactive whiteboard appliance (IWB) has an abundance of features and capabilities for sharing documents, videoconferencing, and performing other tasks. While the graphical user interface includes graphical elements like menus and icons for invoking some of the various features and capabilities, the inclusion of additional graphical elements may complicate the graphical user interface beyond what is desirable. Further, a novice user may not have knowledge of the menus and icons. Hence the main utility of a command assistant is to discover commands for a user and walk-through different operations so that operating the interactive whiteboard appliance becomes easier.

According to an embodiment, an IWB includes an interactive command assistant that appears to the user as an interactive command assistant chat window. In the interactive command assistant chat window, the interactive command assistant provides textual prompts to guide the user through a hierarchical command tree. The interactive command assistant is in communication with an interactive command manager that accesses the hierarchical command tree and generates an executable command from the user's responses to the prompts in the interactive command assistant chat window.

System Overview

Figure 1:
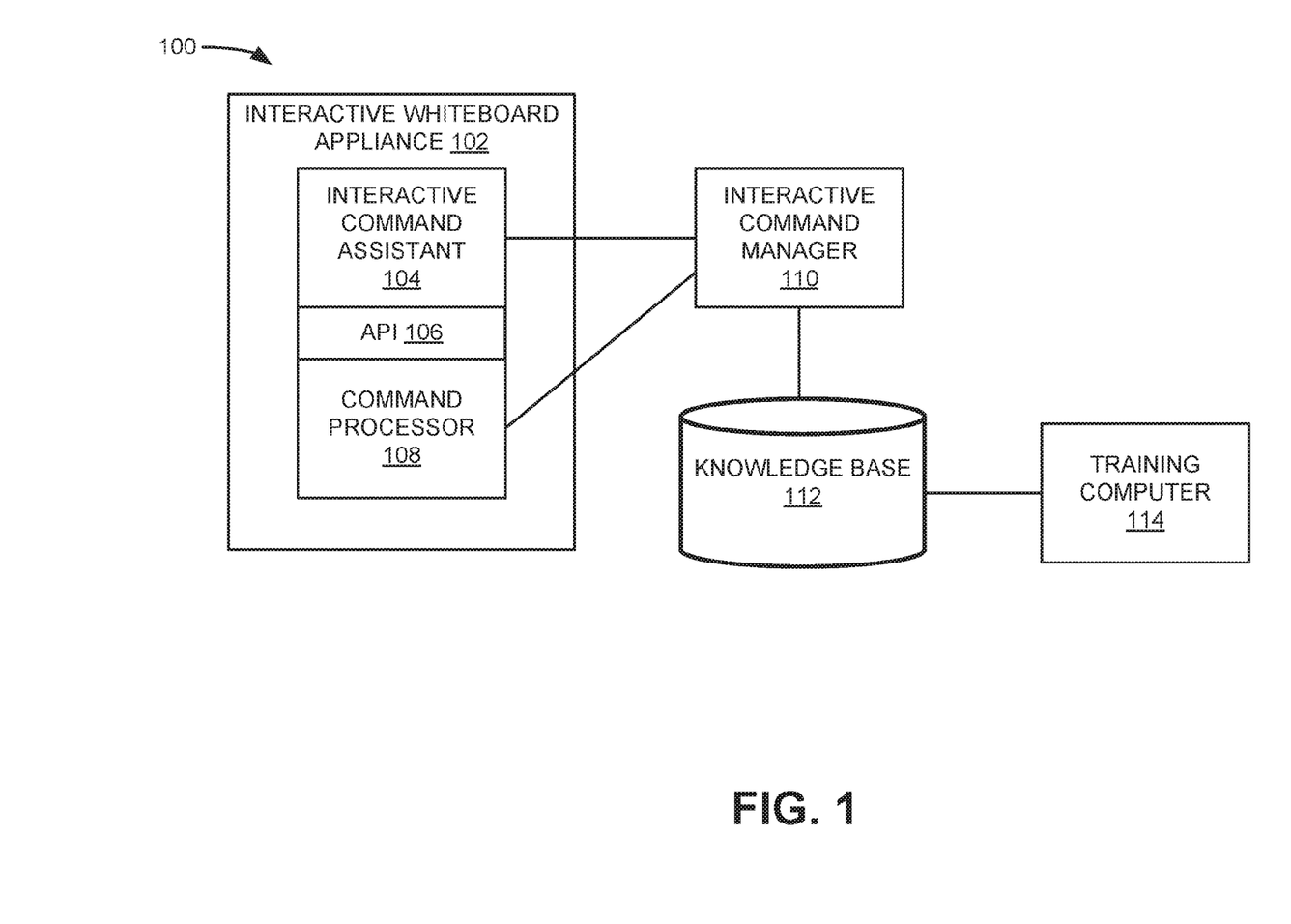
FIG. 1 depicts a networked environment in which various embodiments may be practiced.

FIG. 1 depicts a networked environment 100 in which various embodiments may be practiced. The networked environment 100 comprises two or more computing devices that are configured to communicate with one another via an electronic network, such as a Local Area Network (LAN), a Wide Area Network (WAN), or the Internet. In some instances, some of the computing devices may communicate via a LAN while others may communicate via a WAN or the Internet. The networked environment 100 allows an IWB to access additional functionality of an interactive command manager without requiring substantial changes to the IWB itself.

The IWB 102 is configured to communicate, via a network, with a remote interactive command manager 110. The IWB 102 is a collaboration and conferencing device that provides communication and annotation capabilities in real-time for a plurality of users. Some features of the IWB 102 include, but are not limited to: annotation of documents; sharing of files; real-time annotation across multiple IWBs (not depicted), mobile apps, and third party solutions; sharing and syncing of data with cloud-based services; optical character recognition; and localization capabilities. The IWB 102 may be controlled by a user via a stylus or a touchscreen. The IWB 102 includes a computing devices infrastructure such as networking capabilities, an operating system, a web browser, and can execute dedicated applications from third parties. The IWB 102 further includes IWB-specific applications for retrieving and opening documents, annotating documents, real-time sharing of documents and annotations, video conferencing, teleconferencing, and saving documents.

The IWB 102 comprises an interactive command assistant 104 that provides an interactive command assistant chat window in a graphical user interface rendered by the IWB 102. The interactive command assistant 104 may be initiated on start-up of the IWB 102 or in response to a user input, such as a selection of an icon or menu option. Upon initiation, the interactive command assistant 104 causes the IWB 102 to provide and render an interactive command assistant chat window. The interactive command assistant 104 receives one or more inputs from the user which it communicates to the interactive command manager 110.

The IWB 202 is in electronic communication with the interactive command manager 110 via a network. The interactive command manager 110 receives user inputs from the IWB 102 and returns an executable command through an iterative process. The interactive command manager 110 may receive user inputs from more than one IWB 102. The iterative process causes the interactive command manager 110 to identify and navigate through a hierarchical tree structure corresponding to a first user input received by the interactive command manager 110.

A knowledge base 112 stores hierarchical tree structures that can be accessed and navigated by the interactive command manager 110. The hierarchical tree structures each have at least one non-leaf node and at least one leaf node. A non-leaf node is a parent node of one or more child nodes that, in turn, are leaf nodes or non-leaf nodes. A leaf node is a node that does not have any child nodes and is also referred to herein as a terminal node. Examples of hierarchical tree structures are provided in FIGS. 4A, 4B, 5A, and 5B. Leaf or terminal nodes complete the command logically and makes a fully understandable commands from IWB perspective.

The knowledge base 112 may change over time as new commands and flows are added or modified. The interactive command manager 110 may be trained with new knowledge base data whenever knowledge base 112 changes.

A training computer 114 generates and provides the hierarchical tree structures to the knowledge base 112. The training computer 114 establishes a data structure that distinguishes between entities, concepts, outputs, and flows. Additional structures may include operations, commands, logic, syntax, and semantics. The entities include applications executable by the IWB 102 such as "Meeting", "Chrome" Internet browser, "Lync" messaging service, "command Line interface, and "Task Manager" (see, e.g., FIG. 5A). Concepts may be used to establish a grammar. For example, a concept may equate the terms "Whiteboard", "IWB", "Interactive Board", and "Interactive Whiteboard." An output organizes textual prompts that are provided to the user to provide context to options provided and may include "How can I help you?" or "I'm sorry. I don't understand your question." A flow may provide options within a same level in a hierarchical data structure.

Examples of training data in XML format are provided below. The data format could be in other formats as well JSON, etc.

```
<entity name="Applications">
    <value name="Meeting" value="Meeting"/>
    <value name="Chrome" value=" Chrome"/>
    <value name="Lync" value="Lync"/>
    <value name="Command Line" value="Command Line"/>
    <value name="Task Manager" value="Task Manager"/>
</entity>
<folder label="Concepts">
    <concept>
        <grammar>
            <item>Whiteboard</item>
            <item>IWB</item>
            <item>Interactive Board</item>
            <item>Interactive whiteboard</item>
        </grammar>
    </concept>
</folder>
<output>
    <prompt>
        <item>How can I help you?</item></prompt>
        <getUserInput>
            <search ref="about"></search>
    <search ref="library"></search>
            <default>
                <output>
                    <prompt>
                        <item>I'm sorry. I don't
understand your question.</item>
                    </prompt>
                </output>
            </default>
        </getUserInput>
    </output>
<flow>
    <folder label="Applications"></folder>
    <folder label="Colors"></folder>
    <folder label="Font sizes"></folder>
</flow>
```

The interactive command manager 110 proceeds to request additional user input until the navigation of the hierarchical tree structure reaches a leaf node. The leaf node is a terminal node in that it has no child nodes. When the interactive command manager 110 reaches a leaf node, the interactive command manager 110 generates and sends an executable command to the IWB 102.

Figure 2:
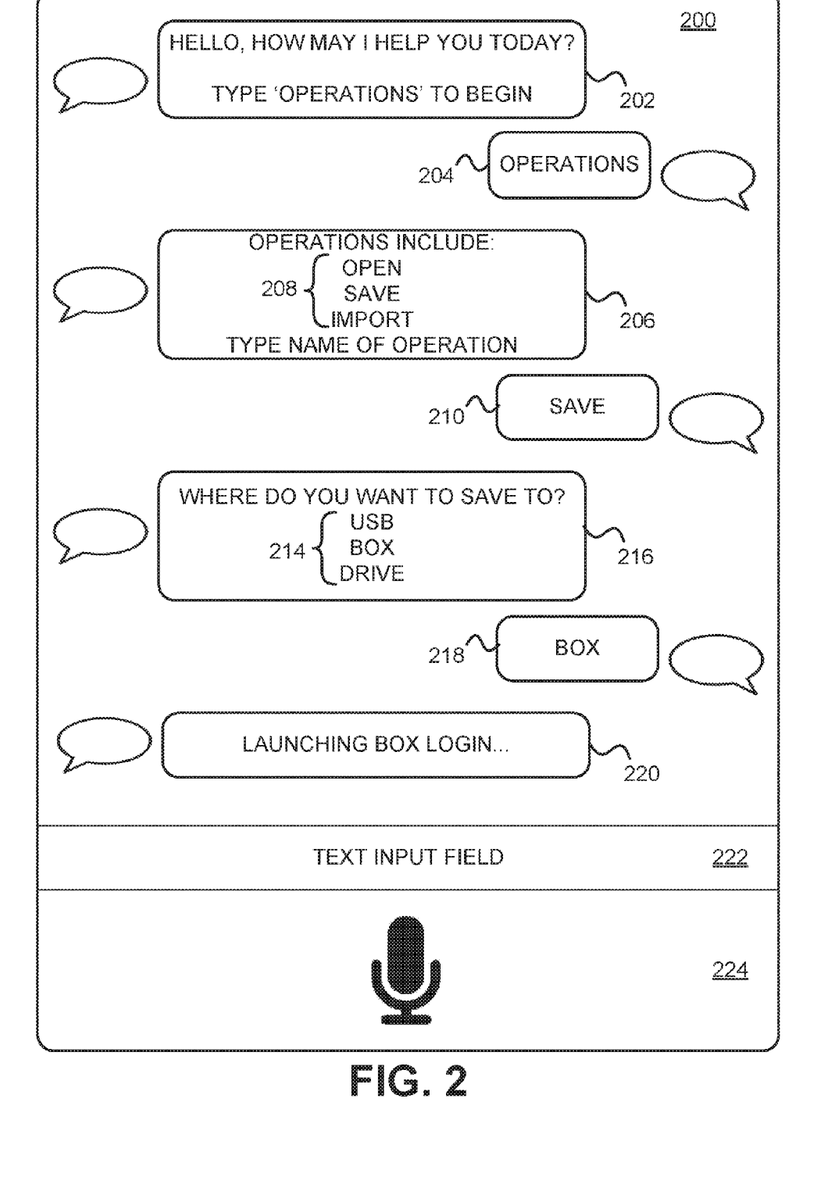
FIG. 2 depicts an example interactive command assistant chat window according to some embodiments.

In some embodiments, if the user does not respond in the interactive command assistant chat window within a period of time, the interactive chat window 200 resets by returning to the initial welcome prompt. This helps to avoid getting stuck in a command loop.

The command processor 108 of the IWB 102 receives the executable command from the interactive command manager 110 and causes the IWB 102 to execute the command. Non-limiting examples of executable commands and their descriptions are included in Table 1:

TABLE 1

| Command | Description |
| --- | --- |
| Add Page | Adds a new page to whiteboard |
| Delete Page | Deletes current page from whiteboard |
| Copy Page | Copies and duplicates the current page |
| Save | Save pdf file to local drive |
| Import | Import last saved pdf from local drive |
| Save Box | Opens Box Authentication for Saving to Box [If token is expired] |
| Import Box | Opens Box Authentication for Import from Box [If token is expired] |
| Save Google Drive | Opens Drive Authentication for Saving [If token is expired] |
| Import Google Drive | Opens Drive Authentication for Import [If token is expired] |
| Print | Opens print preferences dialog |
| Font <color> | Changes font to spoken <color>, e.g Font Red will change pen color to Red |
| Open Chrome | Open google chrome |
| Open Prompt | Open command prompt |
| Open Keypad | Onscreen keypad |
| Start Meeting | Open whiteboard remote meeting dialog, needs IP and Port as input |
| Join Meeting | Open Join remote meeting dialog, needs IP and Port as input |
| Close Meeting | Close the ongoing meeting |
| Select | Select the annotation on whiteboard |
| Select All | Select all annotation on whiteboard |
| Erase All | Erase all annotation on whiteboard |
| Undo | Undo last annotation |
| Redo | Redo last Undo changes |
| Zoom | Opens Zoom panel |
| Start Lync | Start Lync process |
| Start Hangout | Start Google hangout |
| Stop Lync | Stop Lync process |
| Stop Hangout | Stop Google hangout |
| Close <IWB> | Close whiteboard, Close <IWB> or Close <Whiteboard> |
| Recognize <Language> | OCR capabilities to recognize language spoken |

The command processor, upon identifying an executable command from the transcription causes the operating system or an application executing on the operating system to perform an action corresponding to the command.

When an executable command is received by the command processor 108, the command processor 108 causes the IWB 102 to execute the command via an application program interface (API) 106 provided by, for example, the operating system of the IWB 102.

FIG. 2 depicts an example interactive command assistant chat window 200 according to some embodiments. The interactive command assistant chat window 200 is similar to a messaging application in that messages are shown as text contained in voice bubbles. The text provided by the interactive command assistant 104 is depicted along the left side of the interactive command assistant chat window 200. Text corresponding to inputs received from the user is depicted along the right side of the interactive command assistant chat window 200.

An interactive session in the interactive command assistant chat window 200 may begin with an initial prompt 202 rendered automatically in the interactive command assistant chat window 200. The initial prompt, "Hello, how may I help you today? Type 'operations' to begin," is provided automatically. In first response 204 to the initial prompt 202, a user may provide the input, "operations", for example by typing the word "operations". The interactive command assistant chat window 200 includes a text input field 222 in which a user may type his response. In some instances, the user may select a voice input field 224 depicted by a microphone icon. The IWB 102 may use voice recognition capabilities to capture and transcribe the user's response.

Upon receiving the first response 204, the interactive command assistant 104 sends the response 204 to the interactive command manager 110 with data identifying the IWB 102. The interactive command manager 110 accesses the knowledge base 112 and identifies a first hierarchical data structure (see, e.g., tree 400 of FIG. 4A) containing non-leaf node "operations" (see, e.g., node 402 of tree 400). The interactive command manager 104 retrieves a first set of options from the first hierarchical data structure by retrieving the immediate child nodes of the non-leaf node (see, e.g., nodes 404, 406, and 408). The first set of options may correspond to child nodes "open", "save", and "import" of the non-leaf node "operations" in the first hierarchical data structure. The interactive command manager 110 may access additional hierarchical data structures to provide context for the first set of options including the phrases "Operations include" and "Type name of operation".

The interactive command assistant 104 receives the first set of options and the context phrases from the interactive command manager 110. The interactive command assistant 104 renders this data as a second prompt 206 within voice bubble in the interactive command assistant chat window 200. The second prompt 206 includes text of the first set of options 206.

As depicted, in response to the second prompt 206, the user inputs second response 210: "Save" which is one of the options in the first set of options 208. The second response is transmitted to the interactive command manager 110 with data identifying the IWB 102.

Figure 4A:
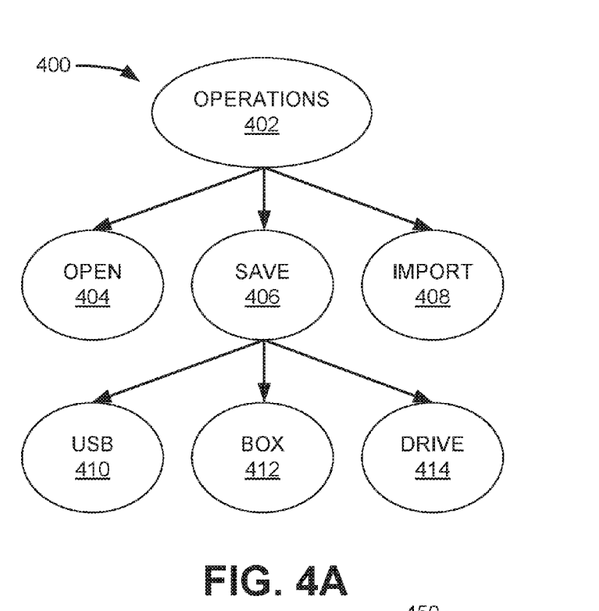
FIGS. 4A and 4B depict example hierarchical command trees according to some embodiments.

The interactive command manager 110, upon receiving second response 210, accesses the first hierarchical data structure (e.g., tree 400) and identifies one or more child nodes of the node "Save" (e.g., node 410, 412, and 414). The interactive command manager 110 determines that the child nodes are leaf nodes and thus terminal nodes. The interactive command manager 110 assembles the child nodes into a second set of options: "USB", "Box", and "Drive". The interactive command manager 110 may further access other hierarchical data structures to access contextual text such as "Where do you want to save to?" The interactive command manager 110 sends the second set of options and the contextual text to the interactive command assistant 104.

The interactive command assistant 104 renders the second set of options as text 214 in third prompt 216 along with the contextual text. In response to the third prompt 216, the user may input a third response 218, the text "Box" which is one of the options in the set of options.

The third response is transmitted to the interactive command manager 110 with data identifying the IWB 102. The interactive command manager 110, by accessing the first hierarchical data structure, determines that a node (e.g., node 412) corresponding to "box" is a leaf node. Because a leaf node is terminal, the interactive command manager 110 generates an executable command from the first response 204, the second response 210, and the third response 218, resulting in the command "Save Box" that appears in Table 1.

Figure 3:
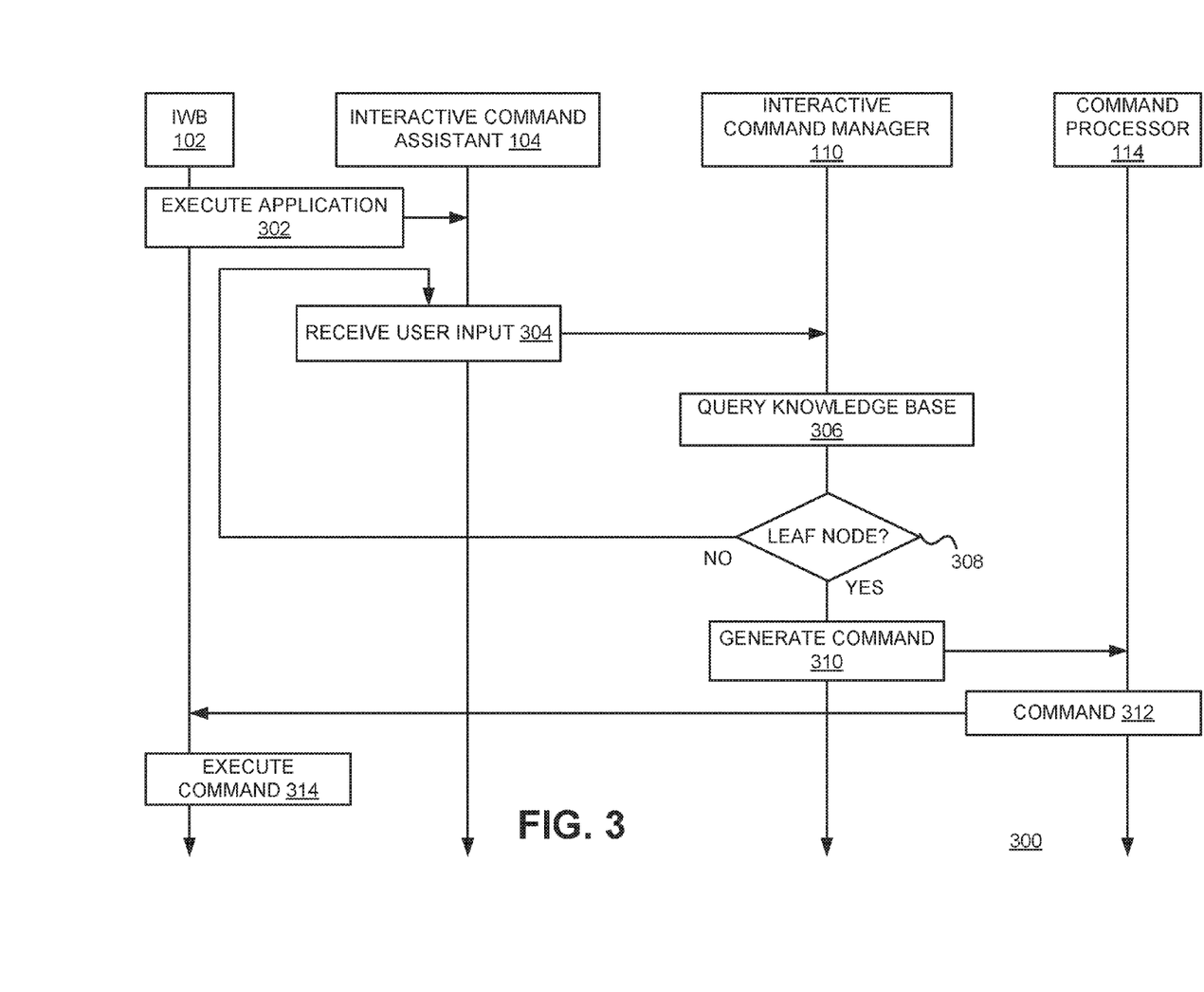
FIG. 3 depicts a multi-lane flowchart of a process for providing interactive command assistance in an interactive whiteboard appliance according to some embodiments.

FIG. 3 depicts a multi-lane flowchart of a process 300 for providing interactive command assistance in an interactive whiteboard appliance according to some embodiments. The process 300 may be performed within a networked environment, as depicted in FIG. 1 or within the IWB 102 itself. The process 300 can be performed each time a user initiates a command from within the interactive command assistant chat window 200. The process 300 results in the IWB 102 executing a command identified through one or more responses received from the user.

In an operation 302, the IWB 102 executes one or more applications such as an annotation application, a file sharing application, or a teleconferencing application. The application may execute one or more commands received from the user.

In an operation 304, the interactive command assistant 104 receives a user input via the interactive command assistant chat window 200. The user input may be a single word like "operations" or a multi-word phrase. In instances where the user input is a single word, the word may be an imperative form of a verb, referred to as a command word, such as "Save", "Open", or "Import". In other instances, the single word may be a noun, referred to as an object word, such as an application name like "Box" (referring to a file management application), "USB", or "Drive" (referring to another file management application).

Some expert users of the IWB 102 may desire a faster way to use the interactive command assistant 104. To facilitate a faster navigation of the underlying hierarchical data structure at the interactive command manager 110, the interactive command assistant 104 may support multi-word phrase inputs received from the user. The multi-word phrase includes a command word and an object word and may be referred to as a command phrase. For example, the user may type the phrase "Save Box" in the interactive command assistant chat window 200.

The interactive command assistant 104 sends the single word input or the multi-word phrase input to the interactive command manager 110. In some embodiments, the input may be packaged with metadata such as a timestamp and an identifier of the IWB 102 or the interactive command assistant 104.

In an operation 306, the interactive command manager 110 queries the knowledge base 112 using the user input. In instances involving a single word input, the interactive command manager 110 identifies a hierarchical data structure having a non-leaf node corresponding to the single word input. If more than one hierarchical data structure has a non-leaf node corresponding to the single word input, the interactive command manager may select a hierarchical data structure according to a number of parent nodes of the non-leaf node. For example, if a first hierarchical data structure has a non-leaf node corresponding to the single word input with no parent nodes (e.g., it is a root node), it would be selected over a second hierarchical data structure having a non-leaf node corresponding to the single word input with a parent node and/or a grandparent node.

In instances involving a multi-word phrase input, the interactive command manager 110 identifies a first word of the multi-word phrase and uses the techniques described in connection with the single word input to identify a hierarchical tree structure in the knowledge base 112. The interactive command manager 110, without further input from the user, navigates through the identified hierarchical tree structure using the second word in the multi-word phrase. If the multi-word phrase has a third word, the interactive command manager 110 navigates through the identified hierarchical tree structure using the third word in the multi-word phrase. For example, if the multi-word phrase is "Change Color Red", the interactive command manager 110 may identify a tree 450 of FIG. 4B by first selecting the tree 450 based on its having a non-leaf node 452 corresponding to "Change" with no parent nodes. The interactive command manager 110, without further input from the user, navigates down tree 450 from node 452 to node 456 corresponding to "Color", the second word in the multi-word command phrase. The interactive command manager 110, without further input from the user, navigates down tree 450 from node 456 to node 460 corresponding to "Red", the third word in the multi-word command phrase.

In the operation 306, additional hierarchical data structures may be identified and navigate to identify contextual text or other data used to provide text that provides directions to the user, notifies the user of errors, or other messages used to make the interactive command assistant more polite or personable.

In an operation 308, the interactive command manager 110 determines whether the navigation of the selected hierarchical data structure has reached a leaf node of the selected hierarchical data structure. The leaf node is a terminal node having no children. In instances involving a single word input, the first user input does not typically correspond to a leaf node if the hierarchical data structure is selected by favoring trees having a node corresponding to the input word that has a fewest number of parent nodes. If the most recent input does not correspond to a leaf node, the process 300 returns to the operation 304 to obtain additional user input. The interactive command manager 110 identifies, from the selected hierarchical data structure a set of options that each correspond to child nodes of the non-leaf node.

In instances involving a multi-word phrase input, the multi-word phrase input may not have enough information to navigate through a selected data structure to reach a leaf node. For example, if the multi-word phrase is "Change Color", referring to FIG. 4B, the interactive command manager 110, without further input from the user, navigates down tree 450 from node 452 to node 456 corresponding to "Color", the second word in the multi-word command phrase. However, node 456 corresponding to "Color" has three child nodes corresponding to "Red" node 460, "Blue" node 462, and "Green" node 464. There is no third word in the multi-word command to navigate to one of the child nodes. In this case, the determination of operation 308 is that a leaf node has not been reached. The interactive command manager 110 identifies, from the selected hierarchical data structure a set of options that each correspond to child nodes of the non-leaf node that has been reached.

In an operation 310, if a leaf node has been reached through a sequence of single word inputs and/or multi-word phrases, the interactive command manager 110 generates an executable command in response to the inputs. The command may be generated in one of two ways. The executable command may be generated by combining the inputs into a command according to the sequence in which they were received. In other embodiments, the interactive command manager 110 compares the inputs receives to a plurality of stored commands such as those included in Table 1. The interactive command manager 110 matches the inputs to one of the plurality of stored commands and generated an executable command from the stored commands. The interactive command manager 110 sends the executable command to the IWB 102.

In an operation 314, the executable command is received by the command processor 108 of the IWB 102. The command processor 108 using API 110 to cause the IWB 102, the operating system of the IWB 102, and/or an application running on the IWB 102 to execute the executable command.

Figure 5A:
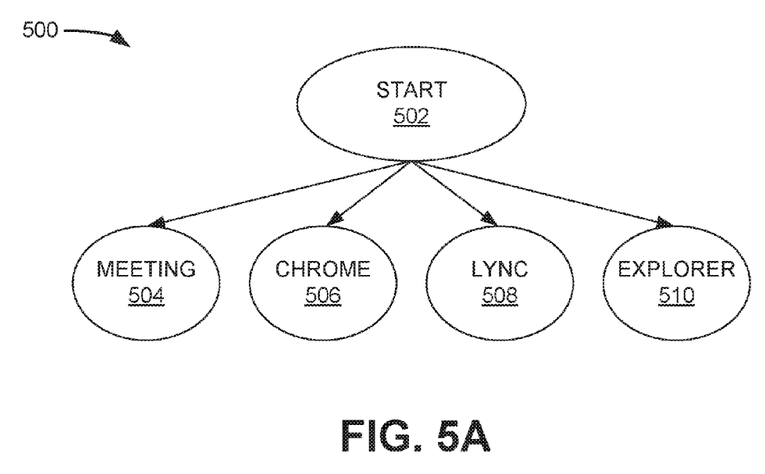
FIGS. 5A and 5B depict example hierarchical command trees according to some embodiments.
Figure 5B:
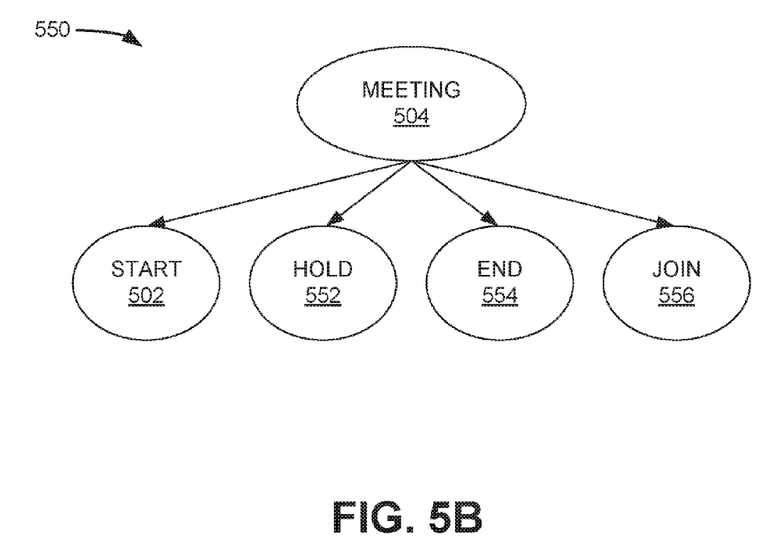

FIGS. 5A and 5B depict example hierarchical command trees according to some embodiments. The trees depicted are examples and provided for illustrative purposes only. Further, for simplicity, some child nodes are excluded from the trees to focus the reader's attention on the navigation of the trees rather than the complexity of the trees. The trees may have at least two levels and comprise at least one non-leaf node and at least one leaf node. A child node may be a non-leaf (e.g., parent) node or a leaf node. In some instances, more than one tree may include a node that corresponds to a single word input.

The trees are generated by the training computer 114, stored in the knowledge base 112, and accessed by the interactive command manager 110. The interactive command manager 110 may temporarily load a selected tree into a short-term memory until an executable command is generated from the selected tree.

Command trees may start with command words including "action" verbs such as "Start", "Stop" or nouns or names representing processes, applications, colors or other entities. to the different trees may align with many possible user input variations in the interactive command assistant chat window. If the user is more likely to input "action" keywords first, then the training computer 114 may generate a tree starting with an "action" verb, else otherwise.

Referring now to FIG. 4A, tree 400 comprises a root node 402 corresponding to "Operations". The "Operations" node 402 may be prompted to the user as depicted in FIG. 2 as an initial command. The child nodes of node 402 are "Open" node 404, "Save" node 406, and "Import" node 408. The child nodes correspond to command words that also may be used to initiate a command using the interactive command assistant 104. The child nodes of the "Save" node 406 are "USB" node 410, "Box" node 412, and "Drive" node 414. Child nodes of nodes 404 and 408 are excluded from the drawing for simplicity. These child nodes are leaf nodes, having no further children themselves. When generating an executable command from the tree 400, the interactive command manager 110 may disregard the "operations" input and assemble the command from the two lowest levels of the tree 400. For example, from tree 400, the interactive command manager 110 may assemble the commands "Save Box", "Save USB", or "Save Drive".

Figure 4B:
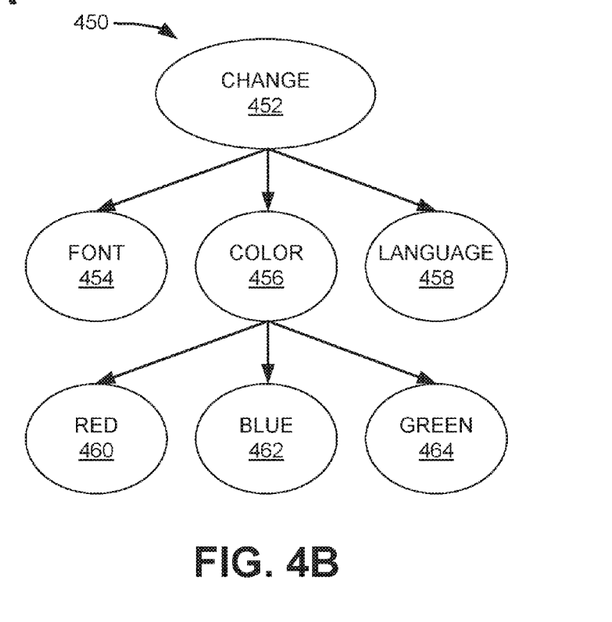

Referring now to FIG. 4B, tree 450 comprises a root node 452 corresponding to the command word "Change". The child nodes of node 452 are "Font" node 405, "Color" node 456, and "Language" node 458. The child nodes correspond to object words that also may be used to form a command using the interactive command assistant 104. The child nodes of the "Color" node 456 are "Red" node 460, "Blue" node 462, and "Green" node 464. Child nodes of nodes 454 and 458 are excluded from the drawing for simplicity. These child nodes are leaf nodes, having no further children themselves. When generating an executable command from the tree 400, the interactive command manager 110 may combine words corresponding to nodes 452, 456 and one of "Red" node 460, "Blue" node 462, and "Green" node 464. For example, from tree 450, the interactive command manager 110 may assemble the commands "Change Color Red", "Change Color Blue", or "Change Color Green".

Moving on to FIGS. 5A and 5B, trees 500 and 550 are arranged such that a user can first input a command word or an object word and still navigate through a hierarchical data structure. Different hierarchical data structures are navigated depending on the order of the user inputs. The first user input is the command word "Start". Node 502 corresponding to "Start" is included in both trees 500 and 550. In tree 500, "Start" corresponds to a non-leaf node having no parent nodes. In tree 550, "Start" corresponds to a leaf node having one parent node. Because the node 502 is non-leaf node and has fewer parent nodes in tree 500, the tree 500 is selected instead of the tree 550.

In the tree 500, "Start" node 502 is connected to leaf nodes corresponding to object words "Meeting" 504, "Chrome" 506, "Lync" 508, and "Explorer" 510. For example, from tree 500, the interactive command manager 110 may assemble the commands "Start Meeting", "Start Chrome", "Start Lync", or "Start Explorer".

In the tree 550, "Meeting" node 504 is connected to child nodes corresponding to command words "Start" 502, "Hold" 552, "End" 554, and "Join" 556. The nodes 502, 552, 554, and 556 in tree 550 are leaf nodes. For example, from tree 500, the interactive command manager 110 may re-order the input words and assemble the commands "Start Meeting", "Hold Meeting", "End Meeting", or "Join Meeting".

For more sophisticated command examples such as "Send email Rathna@ricoh.com" the IWB appliance 102 may access other data sources such as corporate employee directory or LDAP directory to look-up user names. In the example, the interactive command assistant 104 stores command "Send email" but before executing the command on the IWB appliance 102, the IWB appliance 102 interacts with required databases.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
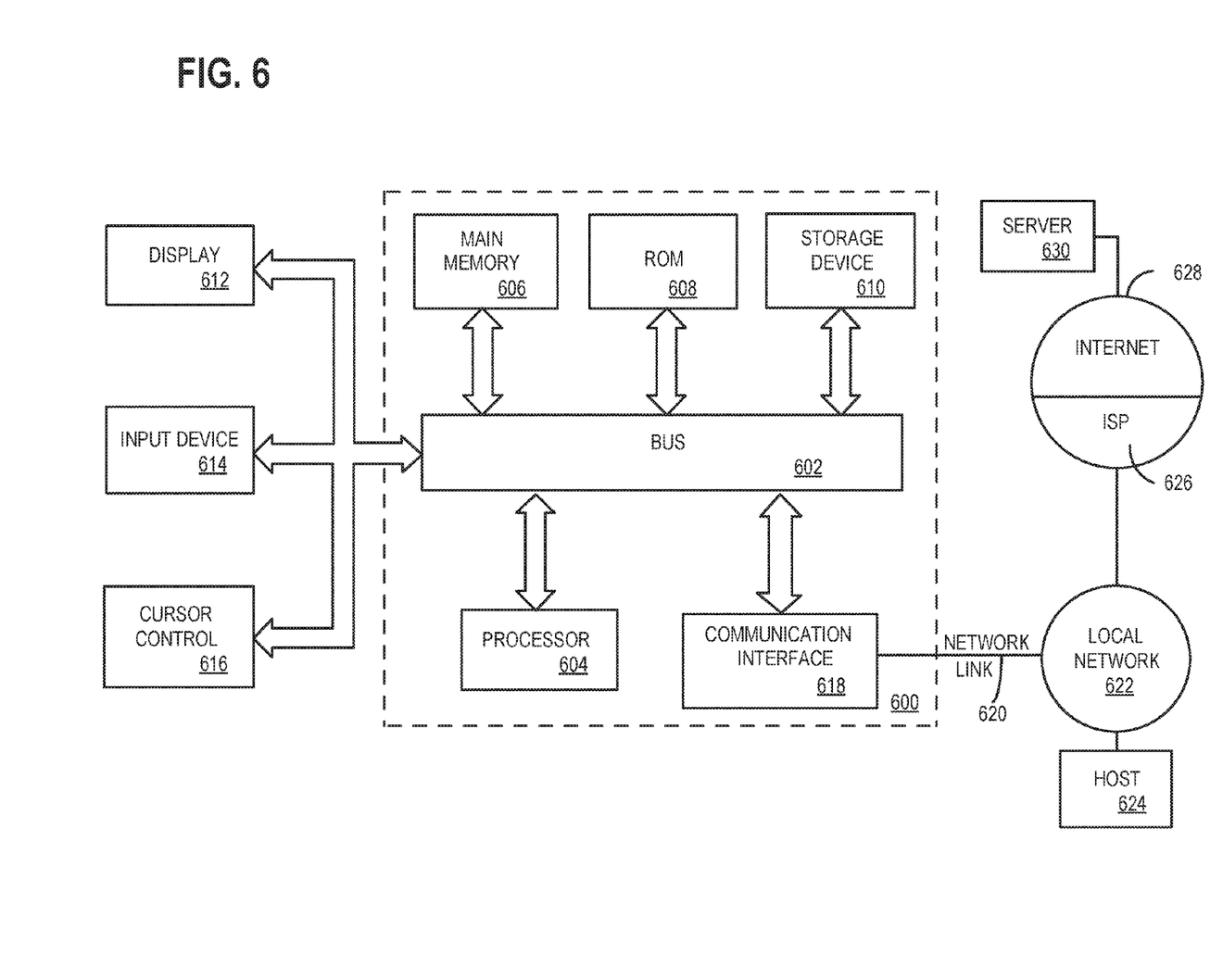
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An interactive whiteboard appliance comprising:
   one or more processors;
   a non-transitory computer-readable medium having instructions embodied thereon, the instructions when executed by the one or more processors cause performance of:
      generating, at the interactive whiteboard appliance, an interactive command assistant chat window, the interactive command assistant chat window comprising a prompt including a first set of response options for the prompt, wherein each response option from the first set of response options comprises a command word;
      receiving a first selection of a first response option from the first set of response options;
      submitting, to an interactive command manager, the command word for the first response option and causing the interactive command manager to identify a hierarchical structure from a plurality of hierarchical structures stored in a knowledge base having the command word as a non-leaf node and including a second set of response options as child nodes of the non-leaf node;
      receiving, from the interactive command manager, the second set of response options, wherein each response option, from the second set of response options, comprises an object word corresponding to the command word;
      displaying, in the interactive command assistant chat window, the second set of response options;
      receiving, via the interactive command assistant chat window, a second selection of a second response option from the second set of response options;
      submitting, to the interactive command manager, the second response option and causing the interactive command manager to determine whether a combination of the first response option and the second response option represent a complete command and, in response to determining that the combination of the first response option and the second response option represent the complete command, generate, from the first response option and the second response option, an executable command of an application executed by the interactive whiteboard appliance;
      receiving, from the interactive command manager, the executable command;
      automatically causing the interactive whiteboard appliance to execute the executable command.

2. The interactive whiteboard appliance of claim 1, wherein the instructions, when executed, further cause:

receiving, in the interactive command assistant chat window, a command phrase including a different command word and a different object word;

submitting, to the interactive command manager, the different command word and causing the interactive command manager to identify a different hierarchical structure from the plurality of hierarchical structures stored in the knowledge base corresponding to the different command word;

receiving, from the interactive command manager, a third set of response options each comprising an object word corresponding to the command word;

determining that the object word matches a third response option of the third set of response options;

submitting, to the interactive command manager, the third response option and causing the interactive command manager to determine whether a combination of the different command word and the different object word option represent a complete command, in response to determining that the combination of the different command word and the different object word represent the complete command, and to generate, from the different command word and the different object word, a different executable command of the interactive whiteboard appliance;

receiving, from the interactive command manager, the different executable command;

automatically causing the interactive whiteboard appliance to execute the different executable command.

3. The interactive whiteboard appliance of claim 1, wherein the instructions, when executed, further cause:

determining whether the second response option is the first response option, in response to determining that the second response option is not the first response option, submitting, to the interactive command manager, the second response option and causing the interactive command manager to identify, from the hierarchical structure from a plurality of hierarchical structures stored in the knowledge base corresponding to the command word, one or more third response options that are child nodes of the second response option;

receiving, from the interactive command manager the one or more third response options;

displaying, in the interactive command assistant chat window, the one or more third response options;

receiving, in interactive command assistant chat window, a third selection of a third response option of the one or more third response options;

determining that the third response option is the first response option.

4. The interactive whiteboard appliance of claim 1, wherein the interactive command manager determines that the second response option is the first response option by:

receiving, from the interactive command manager, an instruction that at least one response option from the second set of response options is the first response option;

determining that the selected second response option matches the at least one of the second set of response options that is the first response option.

5. The interactive whiteboard appliance of claim 1, wherein the interactive command manager determines that the second response option is the first response option by:

determining, that the first response option and the second response option together are associated with a stored executable command.

6. The interactive whiteboard appliance of claim 1, wherein the first selection of the first response option is received via a stylus input device.

7. The interactive whiteboard appliance of claim 1, wherein the first selection of the first response option is received via a microphone associated with the interactive whiteboard appliance.

8. A method comprising:

generating, at an interactive whiteboard appliance, an interactive command assistant chat window, the interactive command assistant chat window comprising a prompt including a first set of response options for the prompt, wherein each response option from the first set of response options comprises a command word;

receiving a first selection of a first response option from the first set of response options;

submitting, to an interactive command manager, the command word for the first response option and causing the interactive command manager to identify a hierarchical structure from a plurality of hierarchical structures stored in a knowledge base having the command word as a non-leaf node and including a second set of response options as child nodes of the non-leaf node;

receiving, from the interactive command manager, the second set of response options, wherein each response option, from the second set of response options, comprises an object word corresponding to the command word;

displaying, in the interactive command assistant chat window, the second set of response options;

receiving, via the interactive command assistant chat window, a second selection of a second response option from the second set of response options;

submitting, to the interactive command manager, the second response option and causing the interactive command manager to determine whether a combination of the first response option and the second response option represent a complete command and, in response to determining that the combination of the first response option and the second response option represent the complete command, generate, from the first response option and the second response option, an executable command of an application executed by the interactive whiteboard appliance;

receiving, from the interactive command manager, the executable command;

automatically causing the interactive whiteboard appliance to execute the executable command.

9. The method of claim 8, further comprising:

receiving, in the interactive command assistant chat window, a command phrase including a different command word and a different object word;

submitting, to the interactive command manager, the different command word and causing the interactive command manager to identify a different hierarchical structure from the plurality of hierarchical structures stored in the knowledge base corresponding to the different command word;

receiving, from the interactive command manager, a third set of response options each comprising an object word corresponding to the command word;

determining that the object word matches a third response option of the third set of response options;

submitting, to the interactive command manager, the third response option and causing the interactive command manager to determine whether a combination of the different command word and the different object word option represent a complete command, in response to determining that the combination of the different command word and the different object word represent the complete command, and to generate, from the different command word and the different object word, a different executable command of the interactive whiteboard appliance;

receiving, from the interactive command manager, the different executable command;

automatically causing the interactive whiteboard appliance to execute the different executable command.

10. The method of claim 8, further comprising:

determining whether the second response option is the first response option, in response to determining that the second response option is not the first response option, submitting, to the interactive command manager, the second response option and causing the interactive command manager to identify, from the hierarchical structure from a plurality of hierarchical structures stored in the knowledge base corresponding to the command word, one or more third response options that are child nodes of the second response option;

receiving, from the interactive command manager the one or more third response options;

displaying, in the interactive command assistant chat window, the one or more third response options;

receiving, in interactive command assistant chat window, a third selection of a third response option of the one or more third response options;

determining that the third response option is the first response option.

11. The method of claim 8, wherein the interactive command manager determines that the second response option is the first response option by:

receiving, from the interactive command manager, an instruction that at least one response option from the second set of response options is the first response option;

determining that the selected second response option matches the at least one of the second set of response options that is the first response option.

12. The method of claim 8, wherein the interactive command manager determines that the second response option is the first response option by:

determining, that the first response option and the second response option together are associated with a stored executable command.

13. The method of claim 8, wherein the first selection of the first response option is received via a stylus input device.

14. The method of claim 8, wherein the first selection of the first response option is received via a microphone associated with the interactive whiteboard appliance.

15. A non-transitory computer-readable medium having instructions embodied thereon, the instructions when executed by one or more processors cause performance of:

generating, at an interactive whiteboard appliance, an interactive command assistant chat window, the interactive command assistant chat window comprising a prompt including a first set of response options for the prompt, wherein each response option from the first set of response options comprises a command word;

receiving a first selection of a first response option from the first set of response options;

submitting, to an interactive command manager, the command word for the first response option and causing the interactive command manager to identify a hierarchical structure from a plurality of hierarchical structures stored in a knowledge base having the command word as a non-leaf node and including a second set of response options as child nodes of the non-leaf node;

receiving, from the interactive command manager, the second set of response options, wherein each response option, from the second set of response options, comprises an object word corresponding to the command word;

displaying, in the interactive command assistant chat window, the second set of response options;

receiving, via the interactive command assistant chat window, a second selection of a second response option from the second set of response options;

submitting, to the interactive command manager, the second response option and causing the interactive command manager to determine whether a combination of the first response option and the second response option represent a complete command and, in response to determining that the combination of the first response option and the second response option represent the complete command, generate, from the first response option and the second response option, an executable command of an application executed by the interactive whiteboard appliance;

receiving, from the interactive command manager, the executable command;

automatically causing the interactive whiteboard appliance to execute the executable command.

16. The non-transitory computer-readable medium of claim 15, wherein the instructions, when executed, further cause:

receiving, in the interactive command assistant chat window, a command phrase including a different command word and a different object word;

submitting, to the interactive command manager, the different command word and causing the interactive command manager to identify a different hierarchical structure from the plurality of hierarchical structures stored in the knowledge base corresponding to the different command word;

receiving, from the interactive command manager, a third set of response options each comprising an object word corresponding to the command word;

determining that the object word matches a third response option of the third set of response options;

submitting, to the interactive command manager, the third response option and causing the interactive command manager to determine whether a combination of the different command word and the different object word option represent a complete command, in response to determining that the combination of the different command word and the different object word represent the complete command, and to generate, from the different command word and the different object word, a different executable command of the interactive whiteboard appliance;

receiving, from the interactive command manager, the different executable command;

automatically causing the interactive whiteboard appliance to execute the different executable command.

17. The non-transitory computer-readable medium of claim 15, wherein the instructions, when executed, further cause:

determining whether the second response option is the first response option, in response to determining that the second response option is not the first response option, submitting, to the interactive command manager, the second response option and causing the interactive command manager to identify, from the hierarchical structure from a plurality of hierarchical structures stored in the knowledge base corresponding to the command word, one or more third response options that are child nodes of the second response option;

receiving, from the interactive command manager the one or more third response options;

displaying, in the interactive command assistant chat window, the one or more third response options;

receiving, in interactive command assistant chat window, a third selection of a third response option of the one or more third response options;

determining that the third response option is the first response option.

18. The non-transitory computer-readable medium of claim 15, wherein the interactive command manager determines that the second response option is the first response option by:

receiving, from the interactive command manager, an instruction that at least one response option from the second set of response options is the first response option;

determining that the selected second response option matches the at least one of the second set of response options that is the first response option.

19. The non-transitory computer-readable medium of claim 15, wherein the interactive command manager determines that the second response option is the first response option by:

determining, that the first response option and the second response option together are associated with a stored executable command.

20. The non-transitory computer-readable medium of claim 15, wherein the first selection of the first response option is received via a stylus input device.

* * * * *